United States Patent [19]
Helms et al.

[11] 3,726,604
[45] Apr. 10, 1973

[54] COOLED JET FLAP VANE

[75] Inventors: Harold E. Helms; Ronald P. Schwedland, both of Indianapolis; Floyd Waters, Jr., Wanamaker, all of Ind.

[73] Assignee: General Motors Corporation, Detroit, Mich.

[22] Filed: Oct. 13, 1971

[21] Appl. No.: 188,904

[52] U.S. Cl..............................415/115, 415/DIG. 1
[51] Int. Cl..............................................F01d 5/14
[58] Field of Search..................415/115, 116, DIG. 1

[56] References Cited

UNITED STATES PATENTS

| | | |
|---|---|---|
| 2,914,916 | 12/1959 | Gelin et al. ...................415/DIG. 1 |
| 3,032,313 | 5/1962 | Szydlowski.........................415/115 |
| 3,370,829 | 2/1968 | Banthin et al. ....................415/115 |
| 3,527,543 | 9/1970 | Howald..............................415/115 |
| 3,528,751 | 9/1970 | Quinones et al...................415/115 |
| 3,540,810 | 11/1970 | Kercher..............................415/115 |
| 3,561,882 | 2/1971 | Somers et al......................415/115 |
| 3,619,077 | 11/1971 | Wile et al. ..........................415/115 |
| 3,628,880 | 12/1971 | Smuland et al....................415/115 |

FOREIGN PATENTS OR APPLICATIONS

| | | |
|---|---|---|
| 1,030,483 | 3/1953 | France............................415/DIG. 1 |
| 1,034,260 | 6/1966 | Great Britain.......................415/116 |

*Primary Examiner*—C. J. Husar
*Attorney*—Paul Fitzpatrick et al.

[57] ABSTRACT

A high temperature gas turbine diverts air compressed by the compressor of the engine for cooling the turbine nozzle vanes. These vanes have laminated walls with passages through the walls for cooling the vane walls. The vanes also have slots adjacent the trailing edge for blowing air toward adjacent vanes to provide a jet flap effect and thus reduce the effective area of the nozzle. The air diverted from the compressor is controlled so as to direct all the air for cooling at maximum engine rating and to use some of the air for jet flap purposes and correspondingly reduce the cooling air at lower power operation of the engine.

8 Claims, 9 Drawing Figures

PATENTED APR 10 1973 3,726,604

INVENTORS.
Harold E. Helms,
Ronald P. Schwedland &
Floyd Waters, Jr.
BY Paul Fitzpatrick
ATTORNEY INVENTORS.
Harold E. Helms,
Ronald P. Schwedland &
BY Floyd Waters, Jr.

Paul Fitzpatrick
ATTORNEY

COOLED JET FLAP VANE

The invention described and claimed herein was made in the course of work under a contract with the Department of Defense.

Our invention is directed to improvements in high temperature turbomachines, such as gas turbines employed in aircraft propulsion. The primary purpose of our invention is to provide for improved cooling of such a turbine and also to provide for some modulation of the flow area through the turbine nozzle. We are able to provide a tolerance for high temperature motive fluid and also to provide some reduction of nozzle area by diverting cooling air to a jet flap on the turbine nozzle vanes when power level, and therefore gas flow and temperature, is lower than maximum.

Our invention is directed to a method and apparatus for improving the versatility of high temperature turbines by diverting air from the compressor to two circuits, one for cooling the turbine nozzle vanes and one for providing jet flap air to reduce the effective area of the nozzle. It is also particularly directed to novel vane structure particularly adapted for carrying out this purpose.

It has long been known that the effective area of the flow channel through a nozzle such, for example, as a throat between adjacent vanes in a turbine nozzle, may be reduced by blowing a sheet of air from the wall defining the nozzle into the flow channel.

It has also long been known that air diverted from the compressor of a gas turbine may be employed to cool the hottest parts of the turbine so as to make possible the use of higher temperature motive fluid and thus increase engine efficiency and specific output.

So far as we are aware, we are the first to combine these two concepts in a way to better adapt the gas turbine engine to operation both at extreme power levels and at lower power levels by control of the cooling and jet flap air.

So far as our preferred structure for cooling the vanes is concerned, it is based in considerable measure upon prior cooled blades and vanes described in the following United States patents and patent applications: Bratkovich and Meginnis U.S. Pat. No. 3,584,972, June 15, 1971, describing a laminated porous material particularly adapted for cooling and the application of the material to the wall of a turbine blade or vane; Helms U.S. Pat. No. 3,560,107, Feb. 2, 1971, disclosing cooling by gas flow chordwise of a vane or blade through the laminated walls of the blade; Helms U.S. Pat. No. 3,554,663, Jan. 12, 1971, further illustrating arrangements for cooling a laminated blade wall; Emmerson U.S. Pat. No. 3,529,902, Sept. 22, 1970, illustrating a turbine nozzle vane of overall configuration somewhat like the preferred vane of the present invention; and Mayeda application Ser. No. 879,094, and Meginnis application Ser. No. 879,110, both filed Nov. 24, 1969, both directed to porous laminated metal blade or vane structures in which the cooling air discharged through the surface of the vane is directed at an acute angle to the vane surface.

The nature and significance of our invention will be clear to those skilled in the art from the succeeding detailed description of the preferred embodiment of the invention and the accompanying drawings thereof.

Figure 1:
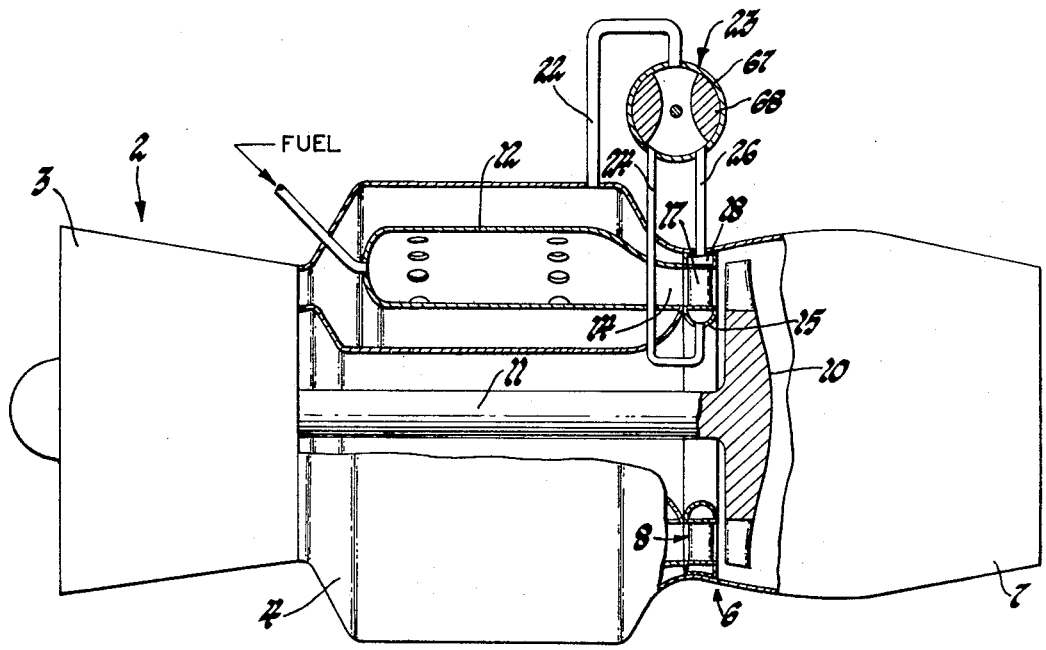
FIG. 1 is a schematic drawing of a gas turbine engine incorporating the invention.

FIG. 1 illustrates schematically a gas turbine jet engine 2 which, except for the turbine cooling and flow modulating system of our invention, may be considered to be conventional. The engine has a compressor 3, combustion apparatus 4, a turbine 6, and an exhaust duct 7. The turbine includes an annular nozzle 8 which directs motive fluid to blades mounted on a turbine wheel 10 which is connected by a shaft 11 to the compressor 3. The combustion apparatus 4 includes a combustion liner or liners 12 to which fuel is supplied and within which it is burned to deliver the motive products through the combustor outlet 14, which may be annular or in sectors, into the turbine nozzle 8. The nozzle 8 includes a hollow inner shroud 15, a cascade of vanes 17, and a hollow outer shroud 18. Such a nozzle may be similarly mounted in the turbine to the first stage nozzle shown in Beam et al. U.S. Pat. No. 3,575,528, Apr. 20, 1971.

Figure 3:
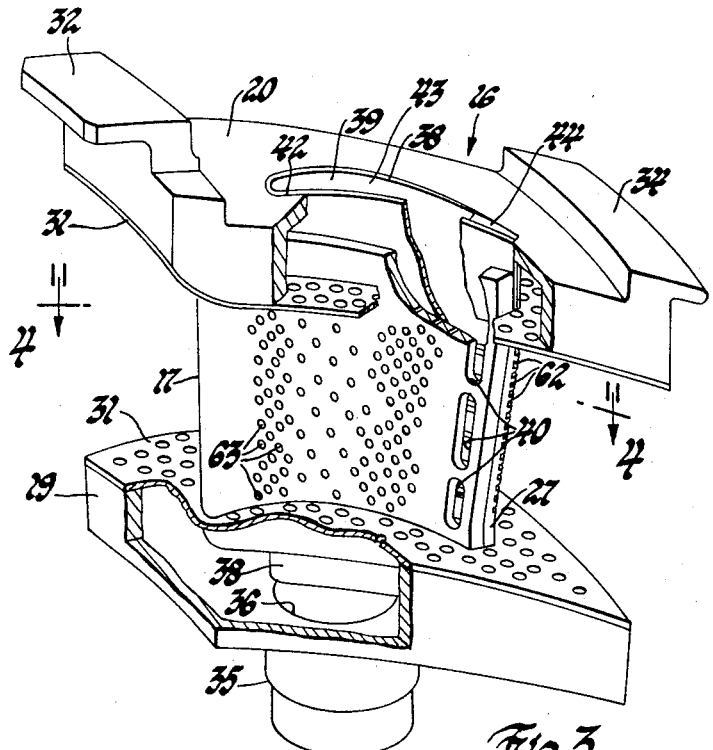
FIG. 3 is an axonometric view, with parts cut away, of a nozzle segment including a vane and shroud segments.

Referring also to FIG. 3, the nozzle is made up of nozzle segments 16 suitably mounted in the engine. Each segment includes a vane or airfoil 17, an inner shroud segment 19 of generally parallelogram outline and a parallelogram-shaped outer shroud segment 20. When the segments are assembled side by side in the fixed structure of a turbine, the annular nozzle is defined and the hollow shrouds 15 and 18 define spaces to which air is supplied in operation of the engine for cooling the vanes and for providing the jet flap flow modulation through the nozzle.

The air circuit, as shown in FIG. 1, includes a compressed air line 22 supplied by the compressor 3, which may take off from the combustion apparatus 4 if desired. Line 22 is connected through a control valve 23 to a cooling air line 24 leading to the inner shroud 15 and to a jet flap air line 26 leading to the outer shroud 18.

Figure 2:
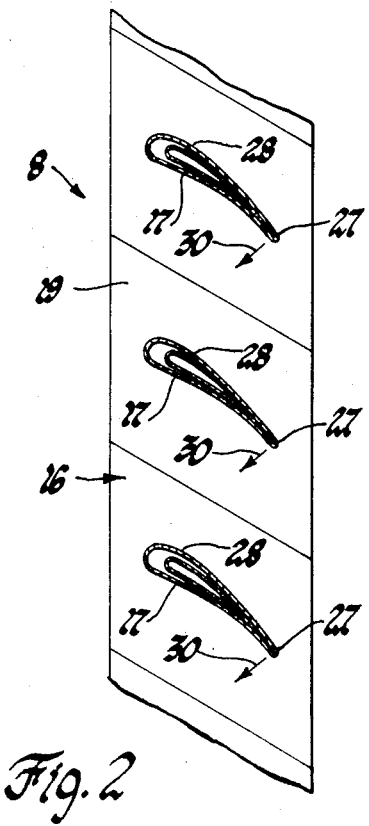
FIG. 2 is a schematic representation of a turbine nozzle cascade with jet flap flow modulation.

To explain the jet flap action briefly, with reference to the somewhat schematic showing of FIG. 2, the motive fluid will flow between the vanes 17 in the direction from top to bottom of FIG. 2, the nozzle throats being defined between the trailing edge 27 of the vane and the convex face 28 of the adjacent vane. By blowing a sheet of air as indicated by the arrows 30 from each vane into the nozzle throats, the flow through the nozzle is constricted and the effective flow area of the nozzle is reduced. Thus, an effect generally equivalent to reducing area by pivoting the vanes is accomplished without the complications of movable parts in this very hot environment.

We now proceed to description of structure of a preferred vane to accomplish the jet flap and cooling functions, with particular reference to FIGS. 3 through 8.

The nozzle segment or shroud and vane 17 shown in FIG. 3 is similar in overall outline and to some extent in structure to that described in U.S. Pat. No. 3,529,902 above, but the cooling arrangements are different and the provision for flap blowing is added. Also, the airfoil is terminated farther forward than the prior structure to leave a trailing edge of sufficient thickness to carry out the purposes of the invention. Note that the shroud segments are of generally parallelogram outline as indicated in FIG. 2, the inner segment being somewhat the narrower. Both shroud segments are of generally box-like structure, each having a facing 31 of material of controlled porosity from which cooling air transpires to cool these facings which define the inner and outer boundaries of the path for hot motive fluid through the nozzle. The outer shroud segment 20 includes flanges 32 and 34 by which it is mounted in the shroud assembly of the turbine.

The inner shroud 19 includes a hollow boss 35 which aids in locating the nozzle segment in the turbine and provides an inlet 36 for cooling air supply to the inner shroud segment 19 and through the hollow vanes 17 into the outer shroud segment 20. The vane wall 17 and facings 31 of the shroud segments are laminated of thin metal sheets. In the specific example described here, the average chord of the vane is about 1.35 inches. The facings 31 of the shroud segments are of three layers of metal of the character described in U.S. Pat. No. 3,584,972, with a total thickness of approximately 0.03 inch. The wall of the airfoil 17 is a laminated sheet of four layers of metal with a total thickness approximately 0.04 inch.

Figure 4:
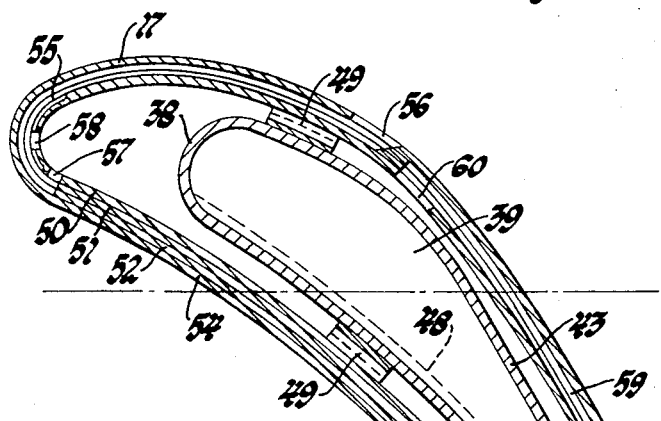
FIG. 4 is a transverse section of the vane taken on the plane indicated by the lines 4—4 in FIGS. 3 and 5.

The vane assembly also includes vane liner 38 of roughly airfoil configuration, which is a folded sheet of non-laminated and non-porous metal; the vane liner provides a conduit 39 as indicated at FIGS. 3 and 4 to conduct the jet flap air to a row of slots 40 adjacent the trailing edge of the vane from which the air is emitted as indicated by the arrows 30 of FIG. 2. The end of the liner adjacent the inlet 36 is seamed closed and the outer end of the liner is sealingly bonded into a mating opening 42 in the outer shroud segment 20. Thus, the blowing air supplied through line 26 to the outer shroud 18 (FIG. 1) may flow through the conduit 39 to the blowing slots 40, and is isolated from the cooling air which is introduced at the other end of the vane through the inlet 36.

Figure 5:
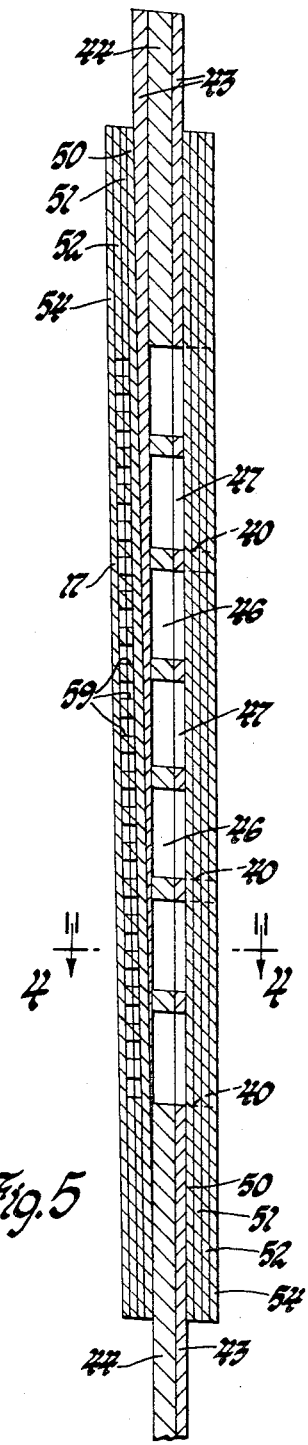
FIG. 5 is a spanwise section of the same taken on the plane indicated by the line 5—5 in FIG. 4.
Figure 6:
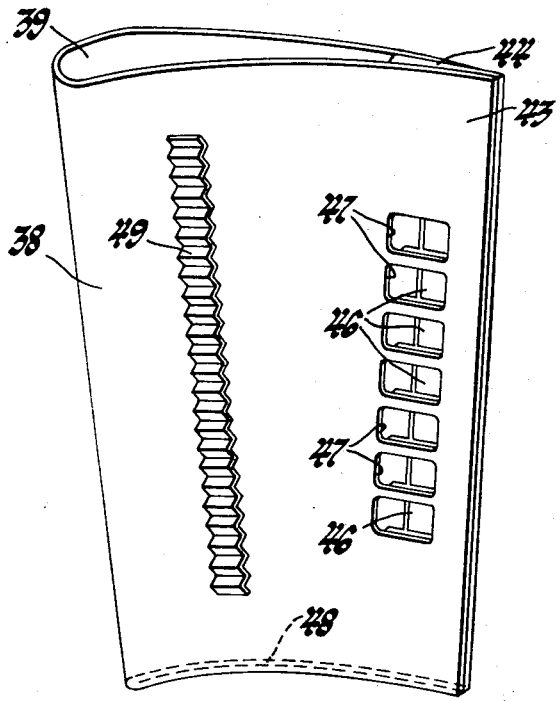
FIG. 6 is an axonometric view of a blade liner.
Figure 8:
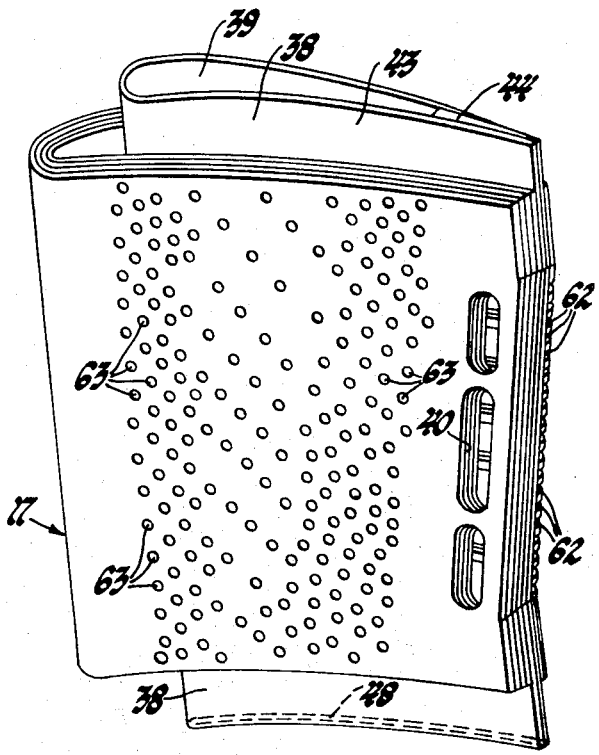
FIG. 8 is a view of the vane and liner assembled.

Considering the liner in more detail, it comprises a folded sheet 43 of generally imperforate sheet metal, the rear edges of which at the trailing edge 27 of the vane are bonded to a joining strip 44, the trailing edge of the sheet 43 at the convex side of the blade, and the joining strip 44 being chamfered away to narrow the trailing edge as shown in FIGS. 4 and 5. Seven slots 46 are cut back into the forward edge of the strip 44 and seven mating slots 47 are cut in the trailing edge of the concave side of wall 43 aligned with the slots 46 as will appear clearly from FIG. 5. These are electric discharge machined after the trailing edge of the liner is bonded. These matched slots provide outlets for the jet flap air to the wall of the vanes 17 and thus to the jet flap slots 40 in the blade wall. These slots 40 provide a substantial continuous blowing slot or blowing means through the span of the vane. Thus, the jet flap air which is introduced through conduit 39 in the liner 38 is discharged through the slots 46 and 47 and out the slots 40. The end of the liner 38 adjacent the entrance 36 is closed as indicated by the broken or dotted lines 48 in FIGS. 4 and 6.

The liner also includes two corrugated spacing strips 49 spot-welded to the liner, as shown. These bridge the gap between the liner and the interior of the vane wall adjacent the forward edge of the liner to inhibit vibration and locate the liner properly within the vane.

We now return to the structure of the vane wall which, as previously indicated, is a laminated structure of four layers each about 0.01 inch thick. Because of questions of available pressure and of the quantity of heat to be absorbed, a variety of cooling methods are employed in the vane wall. Specifically, the leading edge is cooled primarily by impingement, the convex side of the blade by convection, and the concave side principally by transpiration through pores distributed over the wall of the vane. The cooling also involves expedients for cooling the trailing edge notwithstanding the presence of the liner 38 effective to block access of cooling air to this part of the vane wall.

The layers of the wall 17 of the vane or airfoil may be identified from inside out as a first layer 50, a second layer 51, a third layer 52, and a fourth or outermost layer 54. Channels 55 cut chordwise of the blade through the second and third layers extend from the juncture of the concave face and leading edge curvature of the blade to cooling air outlets 56 through the fourth layer adjacent the nozzle throat. These are fed with cooling air from two spanwise extending rows of holes 57 and 58 through the first layer, one row at the beginning of the channel 55 and the other approximately at the mean plane of the leading edge. The pressure difference between the air supplied from the compressor and the lower pressure at the nozzle throat provides for substantial circulation through the channels 55 for impingement cooling of the leading edge by the air striking it from the holes 57 and 58 and convection by circulation through the channels 55. A generally similar arrangement for cooling the portion of the convex or low pressure side of the blade downstream of the leading edge is provided by channels 59 cut through the second and third layers and extending from entrance holes 60 through the first layer to outlets 62 at the main trailing edge defined where the channels 59 reach the trailing edge of the blade. As will be seen, this cooling arrangement for the convex face is rather similar to that described in U.S. Pat. No. 3,560,107 referred to above.

The transpiration cooling of the pressure concave side of the wall is accomplished by a laminated porous material of the general type described in U.S. Pat. No. 3,584,972 referred to above. In this sort of material, the adjacent layers have pores through them which are distributed over the surface and which are out of register as between adjacent layers; and the mating surfaces of the layers have surface relief which provides for flow parallel to the face of the sheets from the holes in one sheet to that in the next so that the cooling air pursues a tortuous controlled path through the porous wall from the interior of the wall to its exterior. The details of such materials need not be explained here but by reference to FIG. 7 it may be stated that the air flows through pores such as those indicated at 63 in the several layers of the vane wall.

Preferably, the outermost or some of the outer layers involve a formation to discharge the cooling air at an acute angle to the vane surface and downstream in the direction of motive fluid flow past the blade, as described in the above-mentioned patent applications of Mayeda and Meginnis. The details of the porous cooling structure are not material to our present invention; therefore no attempt is made to delineate the porous structure in detail here.

Figure 7:
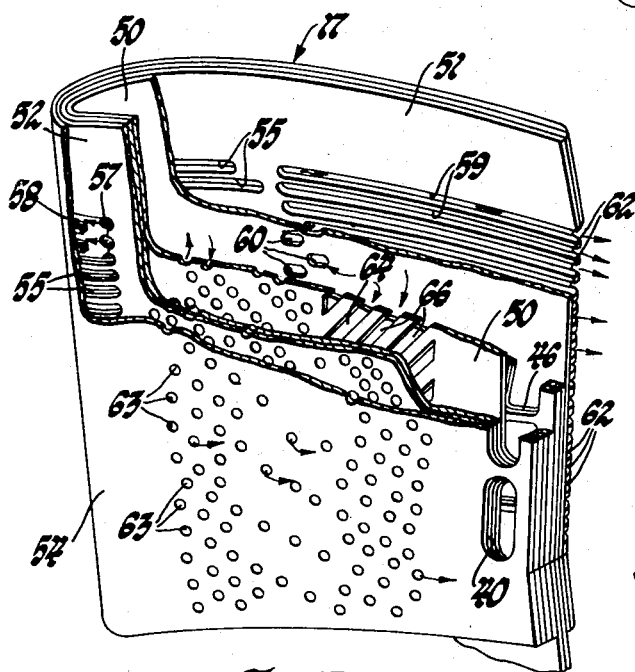
FIG. 7 is a view of the vane wall with layers cut away to illustrate the cooling air flow of the vane.

The particular arrangement to carry air to the trailing portion of the concave face of the blade immediately in advance of the slots 40 is illustrated in FIGS. 4 and 7. Channels 64 cut entirely through layer 50 and extending approximately at 30° to the chord of the blade continue into grooves 66 which are cut only in the outer face of the layer so that the grooves 66 define channels for flow of cooling air from within the vane through the channels 64 and the groove 66 to the porous vane facing near the trailing edge.

The sheet materials of which the vane faces are made may be provided with the channels, perforations, and the like by photoetching processes and joined together by diffusion bonding, as described in prior patents and applications referred to above. These are of suitable high temperature materials; for example, thoria dispersed nickel chromium alloys. The vane wall is pressed against the trailing edge portion of the liner and the vane wall is then bonded by diffusion bonding to the vane liner 17 at the trailing edge to provide a unitary structure. The shroud segments 19 and 20 are then welded to the vane wall 17. When these are mounted to the engine, which may be accomplished by conventional structure with the flanges 32 and 34 and the boss 35 serving to locate each vane segment in the annular cascade, the blowing flap air may be admitted through the conduit 39 and the cooling air through the inlet 36, these two being isolated from each other by the vane liner 38.

Figure 9:
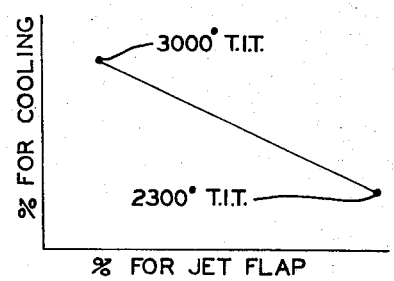
FIG. 9 is a graph illustrating air use control.

Referring now to FIGS. 1 and 9, FIG. 9 illustrates that a maximum temperature which in this case may be considered to be 3,000° F. turbine inlet temperature, the air is directed primarily or entirely for cooling, whereas at the lower operative temperature which might be a 2,300° turbine inlet temperature, the proportion of the air sent to the jet flap is much greater and the cooling air is cut back. In many cases the total available amount of air should be such as to give the desired degree of cooling at the highest temperature with no flap air. It is then normal to increase the flap air as lower operating temperatures are scheduled, making nozzle restriction desirable concurrently as the need for cooling air decreases. The exact form of schedule is a matter, of course, of analysis for any particular installation.

As illustrated in FIG. 1, such a control of the distribution of the air bled from the compressor or combustion chamber jacket of the engine may be effected by a valve such as that shown schematically at 23. Valve 23 includes a casing 67 and a plug 68 rotatable by any suitable means in the casing. If the valve plug is rotated counterclockwise the flow to the cooling channel will diminish and that to the jet flap increase, and vice versa. The configuration of the valve ports may be such as to achieve the desired relation of flow and, of course, the valve might also act to throttle or vary the total flow as a function of the desired flow total as well as vary the proportion sent to the two inlets in the nozzle vanes.

It should be apparent to those skilled in the art that we have presented a scheme for varying the cooling of a turbine nozzle as required and for utilizing some of the air which otherwise might be wasted in cooling as a means to decrease the throat area of the turbine nozzle of the engine and thereby increase its efficiency at lower power levels than the maximum power level. It will also be apparent that the vane structure is particularly adapted to make most advantageous use of cooling air so as to survive in a high temperature with a minimization of waste of cooling air and consequent inefficiency.

The detailed description of the preferred embodiment of the invention for the purpose of explaining the principles thereof is not to be considered as limiting or restricting the invention, since many modifications may be made by the exercise of skill in the art.

We claim:

1. A fluid-directing cascade for reaction with a high-temperature gas comprising, in combination, first and second shroud means bounding the flow path through the cascade and a plural number of airfoils extending from one shroud means to the other and defining gas paths between the airfoils; each airfoil being hollow and defining slot means adjacent its trailing edge for blowing air toward the adjacent airfoil for modulating gas flow through the gas paths; each airfoil including means for air-cooling the airfoil and an inlet for cooling air; each airfoil also including an inlet for gas flow modulating air and conduit means for conducting the modulating air to the said slot means and isolating it from the cooling air.

2. A fluid-directing cascade for reaction with a high-temperature gas comprising, in combination, first and second shroud means bounding the flow path through the cascade and a plural number of airfoils extending from one shroud means to the other and defining gas paths between the airfoils; each airfoil being hollow and defining slot means adjacent its trailing edge for blowing air toward the adjacent airfoil for modulating gas flow through the gas paths; each airfoil including means for air-cooling the airfoil and an inlet for cooling air at the first shroud means; each airfoil also including an inlet for gas flow modulating air at the second shroud means and conduit means for conducting the modulating air to the said slot means and isolating it from the cooling air.

3. A fluid-directing cascade for reaction with a high-temperature gas comprising, in combination, first and second shroud means bounding the flow path through the cascade and a plural number of airfoils extending from one shroud means to the other and defining gas paths between the airfoils; each airfoil being hollow and defining slot means adjacent its trailing edge for blowing air toward the adjacent airfoil for modulating gas flow through the gas paths; each airfoil including means for air-cooling the airfoil and an inlet for cooling air; each airfoil also including an inlet for gas flow modulating air and conduit means for conducting the modulating air to the said slot means and isolating it from the cooling air; means for supplying air from a source; and means for variably dividing the said air between the two said inlets.

4. A high-temperature turbine including an annular nozzle for directing motive fluid, the nozzle including first and second shrouds and a cascade of nozzle vanes extending from one shroud to the other; each vane including fluid jetting means for modulating flow through the nozzle and including fluid cooling means for the vane; each vane having a blowing fluid inlet and a cooling fluid inlet; a source of fluid under pressure; and means for variably apportioning the fluid from the said source between the blowing fluid and cooling fluid inlets.

5. A high-temperature turbine including an annular nozzle for directing motive fluid, the nozzle including first and second shrouds and a cascade of nozzle vanes extending from one shroud to the other; each vane including air blowing means for modulating flow through the nozzle and including air cooling means for the vane; each vane having a blowing air inlet and a cooling air inlet; a source of air under pressure; and means for variably apportioning air from the said source between the blowing air and cooling air inlets.

6. A high-temperature turbine including an annular nozzle for directing motive fluid, the nozzle including first and second shrouds and a cascade of nozzle vanes extending from one shroud to the other; each vane including air blowing means for modulating flow through the nozzle and including air cooling means for the vane; each vane having a blowing air inlet at one end of the vane span and a cooling air inlet at the other end of the vane span; a source of air under pressure; and means for variably apportioning air from the said source between the blowing air and cooling air inlets.

7. A fluid-reacting airfoil for a high-temperature turbomachine comprising, in combination, a laminated formed sheet metal wall defining the exterior contours of the airfoil and defining passages for a cooling fluid through the wall, the interior of the wall defining a plenum for distributing a cooling fluid to the said passages and defining a first inlet into the said plenum for the cooling fluid; the wall defining slot means extending spanwise of the blade for emission of fluid for generation of a jet flap extending from the airfoil; and conduit means within the airfoil for conducting jet flap defining fluid to the slot means including a second inlet, the conduit means isolating the cooling fluid from the jet flap defining fluid.

8. A fluid-reacting airfoil for a high-temperature turbomachine comprising, in combination, a laminated formed sheet metal wall defining the exterior contours of the airfoil and defining passages for a cooling fluid through the wall and means defining shroud segments at the ends of the airfoil; the interior of the blade defining a plenum for distributing a cooling fluid to the said passages and defining a first inlet at one shroud segment into the said plenum for the cooling fluid; the wall defining slot means extending spanwise of the blade for emission of fluid for generation of a jet flap extending from the airfoil; and conduit means within the airfoil for conducting jet flap defining fluid to the slot means including a second inlet at the other shroud segment, the conduit means isolating the cooling fluid from the jet flap defining fluid.

* * * * *